R. W. TARRANT.
RAILWAY AND LIKE SIGNALING.
APPLICATION FILED APR. 20, 1916.
1,277,505.
Patented Sept. 3, 1918.
2 SHEETS—SHEET 1.
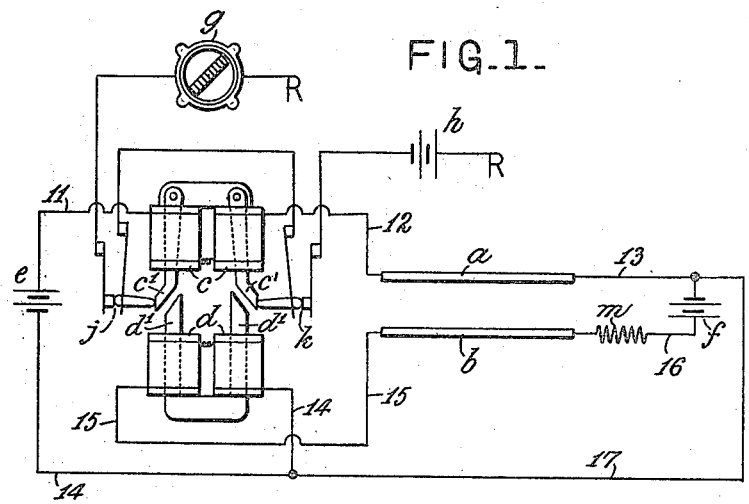
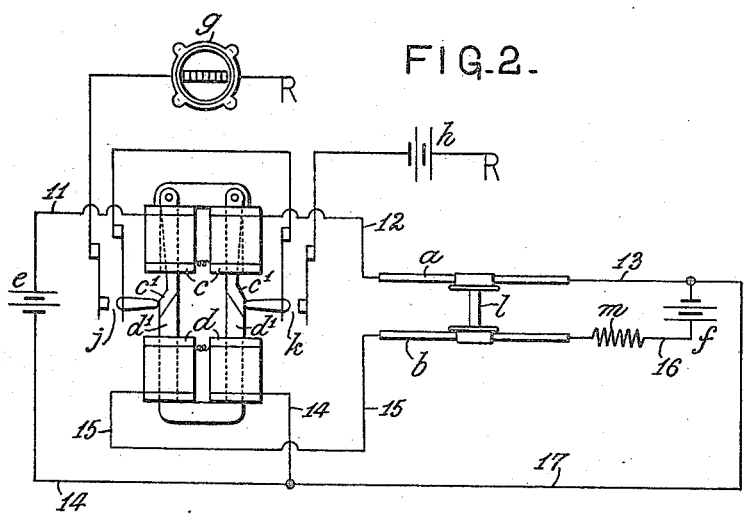
WITNESSES:
George Du Boy
Henry Ruhl
INVENTOR
REUBEN W. TARRANT
BY
ATTORNEYS

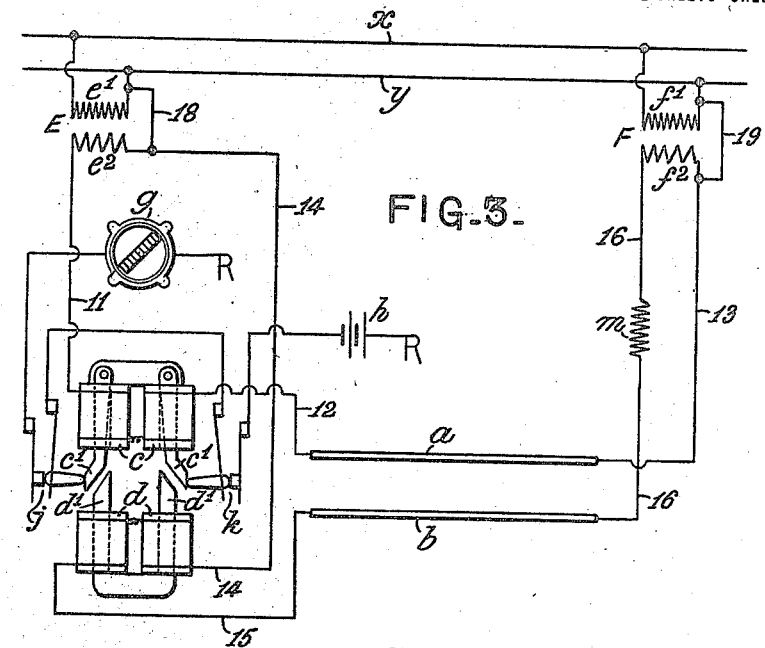

UNITED STATES PATENT OFFICE.

REUBEN WILLIAM TARRANT, OF CLAPHAM, LONDON, ENGLAND.

RAILWAY AND LIKE SIGNALING.

1,277,505.

Specification of Letters Patent.

Patented Sept. 3, 1918.

Application filed April 20, 1916. Serial No. 92,353.

*To all whom it may concern:*

Be it known that I, REUBEN WILLIAM TARRANT, a subject of the King of Great Britain, and resident of 26 Voltaire road, Clapham, London, S. W., England, have invented certain new and useful Improvements in Railway and like Signaling, of which the following is a specification.

This invention relates to an improved rail-circuit system for the electric control of railway traffic.

The improved system of the present invention comprises, for each block-section of the line, a relay having two separate windings one end of each of which is connected to a source of current through one of the track-rails of the block-section, while the other end of each winding is connected to a separate source; an electrical connection between the respective sources of current; and a resistance (which may be a thermal auto-resistance) interposed between the first-mentioned source and one of the track-rails; the arrangement being such that the magnetic fields normally produced by the energization of the respective windings of the relay coöperate in one sense so as to maintain the controlled signal in a predetermined condition, whereas disturbance of the normal current-conditions (as for example by the presence of a train in the block-section) has for effect to cause the magnetic field or fields (if any) to operate in other than the normal sense, so as concurrently to bring about reversal of the condition of the controlled signal.

If the current employed be periodic (*i. e.*, alternating current or pulsating direct current), the respective sources of current should possess the same characteristics, as for example voltage, phase, and periodicity, and should also be synchronous.

In cases where the two sources of current above referred to are separate batteries, they would usually be placed in convenient proximity, respectively, to the opposite ends of the block-section, and the insulated electrical connection between the respective batteries would constitute in effect a line-wire. In cases, however, where current is supplied from mains extending alongside the permanent way, means may be provided for enabling a line-wire distinct from the mains to be dispensed with; such means being adapted to utilize one of the mains themselves as the requisite connection between the two sources of current.

Thus, for example, where alternating current is used, it may be derived from the mains through transformers situated toward the opposite ends of the block-section, the secondary windings of these transformers constituting the respective sources for the immediate supply of the system. In this case, instead of the corresponding ends of the two secondaries being coupled together by a separate line-wire, one end of each secondary winding is connected directly to the same end of its own primary winding or to the corresponding main, the connection being at the same end in both transformers so that, in effect, one of the mains constitutes a direct connection between the corresponding ends of both secondaries. Where direct current derived from mains is used, the provision of special connections such as just described is obviously unnecessary.

The respective coils of the relay are so wound that normally (*i. e.* so long as no train is in the block-section, and no other abnormal current-conditions prevail in the system), the pole-pieces of the core of the one winding will be repelled from the pole-pieces of the core of the other winding in opposition to the gravity or spring-pressure which tends to cause the respective pole-pieces to approach one another; and hence, the switch controlled by the relay will be held in a position to maintain the signal in a predetermined condition (say, "line clear").

The entrance of a train into the block-section, however (or the occurrence of equivalent abnormal current-conditions in the system), will bring about the result that the repulsive action, previously serving to keep the respective pole-pieces apart, will cease or be neutralized, with the result that said pole-pieces will approach one another and thus cause the position of the switch controlled by the relay to be changed so that the condition of the signal will also be reversed (*i. e.* the signal will now be brought, say, to "line blocked"). In some cases the action of gravity or spring-pressure serving to effect the mutual approach of the respective pole-pieces may be reinforced by magnetic attraction set up between said pole-pieces on the occurrence of abnormal current-conditions; the attractive effort being maintained so long as the abnormal conditions continue, and consequently serving to prevent accidental restoration of the controlled signal to its normal state (say "line clear") during the continuance of such conditions within the system.

The relay above referred to may be regarded as constituting either an electric motor, or a relay such as, for example, that described in U. S. Letters Patent No. 1,168,438 dated January 18, 1916.

In the accompanying drawings, which illustrate diagrammatically two arrangements embodying the present invention as applied to a single block-section of a line of railway, Figures 1 and 2 show an arrangement wherein the two sources of current are separate batteries placed respectively near the opposite ends of the section and connected by a separate line-wire, while Figs. 3 and 4 show an arrangement wherein alternating current is derived through transformers from mains extending alongside the permanent way, one of these mains serving as the connection between the secondaries of the respective transformers.

Figs. 1 and 3 each represent the conditions normally existing in the corresponding system, while Figs. 2 and 4 each indicate the conditions resulting from the entrance of a train into the block-section.

In all the figures, $a$, $b$, are the rails of the track within the block-section illustrated; $c$ are the coils of one winding of the relay, and $d$ are the coils of the other winding of the same. The pole-pieces $d'$ of the winding $d$ are stationary, whereas the pole-pieces $c'$ of the winding $c$, which are adjacent and opposed to the pole-pieces $d'$, are pivoted so as to be movable toward and from these stationary pole-pieces and tend to approach the latter under gravity or spring-pressure.

Referring, first, to Figs. 1 and 2, $e$ and $f$ are two separate batteries (of nominally or substantially equal strength) for energizing the relay-windings, the battery $e$ being placed toward that end of the block-section near to which the relay is situated, while the battery $f$ is placed toward the opposite end of the section. The negative pole of the battery $e$ is connected by a wire 11 to one end of the winding $c$ of the relay, the other end of this winding being connected by a wire 12 to the adjacent end of the rail $a$, while the farther end of the same rail is connected by a wire 13 to the positive pole of the battery $f$. Similarly, the positive pole of the battery $e$ is connected by a wire 14 to one end of the winding $d$ of the relay, the other end of this winding being connected by a wire 15 to the adjacent end of the rail $b$, while the farther end of the same rail is connected by a wire 16 to the negative pole of the battery $f$. The positive pole of the battery $f$ is connected by a line-wire 17 with the wire 14, or in other words with the positive pole of the battery $e$; and a resistance $m$ is interposed between the negative pole of the battery $f$ and the rail $b$ for a purpose which will be explained hereinafter.

$g$ is an electrically-actuated or governed signal commanding the admission of traffic to the block-section, the electric circuit upon which the condition of the signal is dependent being indicated as fed with current from a battery or other source $h$. In the circuit of this battery and the signal are interposed two switches $j$ and $k$ which are respectively so controlled by the movable pole-pieces $c'$ of the winding $c$ of the relay that, so long as both the pole-pieces $c'$ are held apart from the stationary pole-pieces $d'$ of the winding $d$, the switches $j$ and $k$ are closed and, the circuit of the battery $h$ and signal $g$ being thus completed, the signal is held at "line clear" as indicated in Fig. 1; whereas, on either or both of the pole-pieces $c'$ approaching the pole-pieces $d'$, the circuit of the battery $h$ and signal $g$ is broken at either or both of the switches $j$ and $k$, and the signal is thus put to "line blocked" as indicated in Fig. 2.

$l$ (Fig. 2) represents an axle and pair of wheels of a train which has entered the block-section and which serves to connect together electrically the rails $a$ and $b$.

The resistance $m$ is interposed between the battery $f$ and rail $b$ for the purpose of preventing excessive increase of current-value when, owing for example to the presence of an axle and pair of wheels in the block-section as in Fig. 2, the battery $f$ is short-circuited across the rails $a$ and $b$. The normal value of the resistance $m$ should be so adjusted as to maintain the proportion, between the current-values in the windings $c$ and $d$ respectively, required for normally causing the pole-pieces $c'$ to be repelled and held apart from the pole-pieces $d'$, as will now be described with reference to Fig. 1.

That is to say, in normal circumstances (i. e. when no train is in the block-section, and no other abnormal current-conditions prevail) current from battery $f$ flows from the positive pole of said battery through wires 17 and 14, the winding $d$ of the relay, wire 15, rail $b$, resistance $m$, and wire 16, back to the negative pole of battery $f$. At the same time current from battery $e$ flows from the positive pole of said battery through wires 14, 17 and 13, rail $a$, wire 12, the winding $c$ of the relay and wire 11 back to the negative pole of battery $e$. The coils $c$ and $d$ are so wound and mounted that each of the poles $c'$ has opposite to it a pole $d'$ of the same sign, while the relative values of the currents by which the coils are respectively energized are so adjusted (by means of the resistance $m$ as already stated) that the movable poles $c'$ are repelled and held apart from the stationary poles $d'$ in opposition to gravity or spring-pressure, with the result that the switches $j$ and $k$ are closed and the signal $g$ is held at "line clear," as indicated in Fig. 1.

If, now, as indicated in Fig. 2, an axle and wheels $l$ enter the block-section, it will be seen that although the winding $c$ remains energized, the current in the winding $d$ is reduced to practically *nil*. That is to say, while on the one hand the battery $f$ is short-circuited through the axle and wheels $l$, current flowing from the battery through wire 13, part of rail $a$, the axle and wheels $l$, part of rail $b$, the resistance $m$ and wire 16, back to battery $f$, on the other hand battery $e$ will now energize the winding $c$ alone, current flowing from battery $e$ through wires 14, 17 and 13, rail $a$, wire 12, winding $c$, and wire 11, back to battery $e$. That the current in winding $d$ is now substantially *nil* results from the fact that with a car axle in the block section the second winding $d$ will be short-circuited by the wires 17, 13, track $a$, axle $l$, track $b$, and wire 15. It will thus be evident that the relative valve-difference between the currents flowing in the respective windings $c$ and $d$, which is necessary for the purpose of maintaining the requisite repulsive force as between the pole-pieces $c'$ and $d'$ is no longer maintained, and consequently the pole-pieces $c'$ will approach the pole-pieces $d'$ and the switches $j$ and $k$ will be opened, with the result that the signal $g$ will be put to "line blocked."

A like result as regards the switches $j$ and $k$ and signal $g$ will be produced not only if current entirely ceases to flow in both of the windings $c$ and $d$, but also if the current flowing in one only of the windings ceases or if the ratio between the values of the currents flowing in the respective windings is caused to vary beyond what may be termed the working limits of said ratio. Moreover, as any such disturbance of the current-conditions within the system (as distinct from total cessation of current in both windings of the relay) will produce a corresponding alteration in the relative strengths of the magnetic fields normally existing between the pole-pieces of the respective windings, the result of the disturbance may even be that the attractive influence of that magnetic field which tends to draw the pole-pieces $c'$ toward the pole-pieces $d'$ may become so much more powerful than the repulsive influence of that field which tends to separate said pole-pieces, that the attractive influence of the first-mentioned magnetic field will coöperate with gravity or spring-pressure in positively resisting any attempt to restore the pole-pieces $c'$ to normal position.

On referring now to Figs. 3 and 4 it will be seen, by comparing the reference symbols used in corresponding figures, that the arrangement illustrated in Figs. 3 and 4 is similar to that illustrated in Figs. 1 and 2 excepting as regards the batteries $e$ and $f$ which, in Figs. 3 and 4, are respectively replaced by the secondary windings $e^2$ and $f^2$ of transformers E and F whose primary windings $e'$ and $f'$ are fed with alternating current from mains $x, y$ extending alongside the track; while the main $y$ is made to serve in place of the line-wire 17 shown in Figs. 1 and 2. For this latter purpose, that end of the primary $e'$ (of the transformer E) which is connected to the main $y$ is connected directly, by a wire 18, to the same end of the secondary $e^2$ or to the wire 14 leading to the winding $d$ of the relay; and similarly, that end of the primary $f'$ (of the transformer F), which is connected to the main $y$ is connected directly, by a wire 19, to the same end of the secondary $f^2$ or to the wire 13 leading to the rail $a$.

The operation of the arrangement illustrated in Figs. 3 and 4 is similar to that of the arrangement illustrated in Figs. 1 and 2, and may be readily followed by reading, along with Figs. 3 and 4, the description of the operation given above with reference to Figs. 1 and 2; it being only necessary, in so doing, to substitute the secondaries $e^2$ and $f^2$ for the batteries $e$ and $f$ respectively, and to substitute "the wire 19, main $y$, and wire 18" for the line-wire 17. Further detailed description of the operation with reference to Figs. 3 and 4 is therefore unnecessary.

It will be observed that the system as a whole involves the use, not of a simple "track-circuit" (in the ordinary or accepted sense of a single circuit whereof both rails of the track, being constantly in series with one another, normally form a portion), but of two distinct so-called "rail-circuits" each of which includes only one of the track-rails in series with one winding of the relay and with a separate source of power; the ratio between the values of the current flowing in the respective windings of the relay being normally substantially constant but being materially altered when the track-rails are connected together electrically, as for example in consequence of the presence of a train upon the rails.

What I claim is:—

1. In a system of electric control for railway traffic, the combination with a pair of track-rails and two sources of electric current, of a relay having two separate windings; one end of the one winding of the relay being connected through the one track-rail to the one pole of one of the sources of current and the other end of the same winding being directly connected to the opposite pole of the other source, while one end of the other winding of the relay is connected to the opposite pole of the first-mentioned source of current through the other track-rail and the other end of said winding is directly connected to the first-mentioned pole of the first source and also to the similar pole of the other source of current.

2. In a system of electric control for railway traffic, the combination with a pair of track-rails, two sources of electric current, and a resistance, of a relay having two separate windings; one end of the one winding of the relay being connected through the one track-rail to the one pole of one of the sources of current and the other end of the same winding being directly connected to the opposite pole of the other source, while one end of the other winding of the relay is connected to the opposite pole of the first-mentioned source of current through the other track-rail and the resistance and the other end of said winding is directly connected to the first-mentioned pole of the first source and also to the similar pole of the other source of current.

3. In a system of electric control for railway traffic, the combination of a pair of track-rails, two sources of electric current, a resistance, a relay, two separate windings on said relay, pole-pieces for each winding of the relay, the pole-pieces of the one winding being opposed to and movable toward and from the respectively adjacent pole-pieces of the other winding and the respective windings being wound for producing normally a state of magnetic repulsion between each pole of the one winding and the opposed pole of the other winding, an electrically-controlled signal, and electric switches interposed in series in the circuit for controlling said signal, said switches being adapted to be controlled by the movable pole-pieces of the relay; one end of the one winding of the relay being connected through the one track-rail to the one pole of one of the sources of current and the other end of the same winding being directly connected to the opposite pole of the other source, while one end of the other winding of the relay is connected to the opposite pole of the first-mentioned source of current through the other track-rail and the resistance and the other end of said winding is directly connected to the first-mentioned pole of the first source and also to the similar pole of the other source of current.

4. In a system of electric control for railway traffic, the combination of a pair of track-rails, two sources of electric current, a resistance, a relay, two separate windings on said relay, pole-pieces for each winding of the relay, the pole-pieces of the one winding being opposed to and movable toward and from the respectively adjacent pole-pieces of the other winding and the respective windings being wound for producing normally a state of magnetic repulsion between each pole of the one winding and the opposed pole of the other winding, an electrically-controlled signal, and electric switches interposed in series in the circuit for controlling said signal, said switches being normally held closed by the movable pole-pieces of the relay; one end of the one winding of the relay being connected through the one track-rail to the one pole of one of the sources of current and the other end of the same winding being directly connected to the opposite pole of the other source, while one end of the other winding of the relay is connected to the opposite pole of the first-mentioned source of current through the other track-rail and the resistance and the other end of said winding is directly connected to the first-mentioned pole of the first source and also to the similar pole of the other source of current.

REUBEN WILLIAM TARRANT.

Copies of this patent may be obtained for five cents each, by addressing the "Commissioner of Patents, Washington, D. C."